United States Patent Office 3,565,752
Patented Feb. 23, 1971

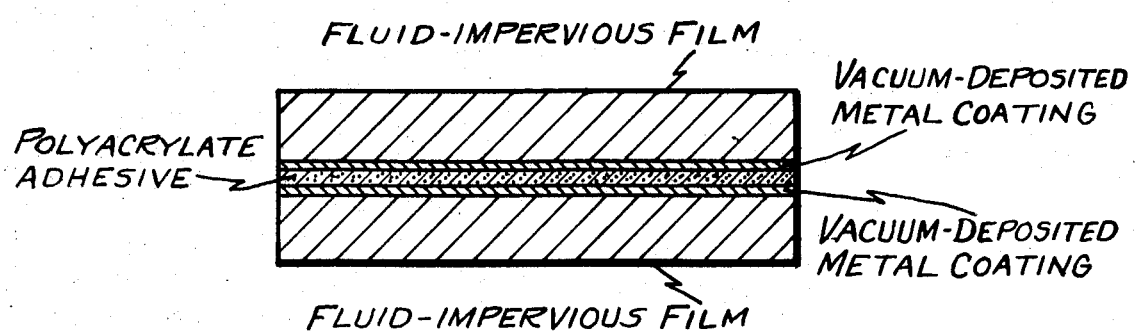

3,565,752
CRYOGENIC ADHESIVE JOINT OF ALUMINIZED POLYESTER FILM BONDED WITH AN ALKYL ACRYLATE ADHESIVE
Richard F. Grossman, Voorheesville, N.Y., assignor to Norton Company, Troy, N.Y., a corporation of Massachusetts
Filed June 12, 1967, Ser. No. 645,217
Int. Cl. E05d 15/00
U.S. Cl. 161—214               2 Claims

ABSTRACT OF THE DISCLOSURE

An adhesive joint for use under cryogenic conditions wherein a polymerized acrylic acid ester pressure-sensitive adhesive having a glass transition temperature of −30° to −60° C. is interposed between two metallized fluid-impervious film surfaces.

FIELD OF INVENTION

The present invention relates generally to a cryogenic joint, and more specifically to such a joint formed by use of a pressure-sensitive adhesive, preferably with such adhesive supported on a film as a pressure-sensitive adhesive tape.

PRIOR ART

Cryogenic systems are developing at a fast pace as technology is developed for and because of our space programs. Elaborate welding and sealing techniques have been developed to form containers for use under these extreme cold conditions. Need has existed for a simple type of joint which would stand up under such conditions and yet would not require expensive facilities to fabricate.

SUMMARY

The present invention utilizes a polyacrylate adhesive having a glass transition temperature of from −30° C. to −60° C. and a number average molecular weight of from 150,000 to 400,000 as the joining means between two surfaces of metallized film material. The resultant joint will remain flexible in liquid nitrogen without failure. Preferably the adhesive is first coated on one of the film surfaces to form an adhesive tape or sheet which may be stored in roll form or in sheet form with a protective liner until ready for use.

DRAWINGS

The drawing is a cross-sectional view of a joint formed in accordance with the present invention.

DESCRIPTION OF PREFERRED EMBODIMENTS

The adhesive used is a polyacrylate pressure-sensitive adhesive. Suitable acrylate esters include ethyl acrylate, 2-ethylhexyl acrylate, butyl acrylate, octyl acrylate and decyl acrylate or mixtures thereof. So long as the polyacrylate is pressure-sensitive, has a number average molecular weight of from 150,000 to 400,000, and has a glass transition temperature of from −30° C. to −60° C., it is operable in the present invention. These adhesives have been found to possess the unusual ability to retain their adhesion at temperatures far below the glass transition temperature of the polymer. It is theorized that this is due to retention of mobility of the side chains which effect the adhesion with this type of polymer in contrast to other polymeric adhesives where the adhesion fails as the glass transition temperature is reached. The glass transition temperature is that temperature at which an amorphous polymer loses its fluidity and behaves as a hard, glassy material.

This adhesive is preferably coated directly onto a metallized film substrate to form an adhesive sheet or tape. While any suitable film may be used, it is preferred to utilize Mylar polyester film. Other films such as polyamide, polyurethane and the like, having suitable flexibility at a temperature of −269° C. may be used, if desired. The metallic coating of tin, aluminum or the like is applied to the film by conventional vacuum metallizing techniques. Preferably, no release coating is applied to the reverse side of the film but the adhesive surface is protected until use by a silicone-coated paper release liner.

The adhesive-coated film is then applied, as desired, to the substrate with which a joint is to be made. Preferably, such substrate is a metallized film of the same general character as the backing described above for the adhesive tape or sheet. Such materials are utilized as insulating materials for cryogenic systems in use on space craft and the like. One specific use is to fashion such materials into cryogenic space tanks, i.e., containers to hold liquids under cryogenic conditions such as fuel for rocket systems, etc. The adhesive-coated film also is capable of patching leaks in such systems should they develop after being placed in use.

One inch wide strips of these adhesive-coated film materials, when applied to a metallized film surface, require 20 to 30 oz. force to produce failure in a 180° peel test at room temperature. After equilibrating at −196° C., adhesion testing immediately upon removal from the liquid nitrogen used to reduce the temperature indicated adhesion values of from 30 to 50 ounces. Flexing of the joints while immersed in liquid nitrogen was carried out without failure of such joints.

As a specific example of a joint of this invention, a coating of 1.2 oz./sq. yd. of a copolymer of 60% ethyl acrylate and 40% 2-ethylhexyl acrylate was applied to a 1 mil Mylar polyester film over a coating of aluminum which had been vacuum deposited on such film. The copolymer was pressure-sensitive, had a glass transition temperature of −35° C. and a molecular weight of 300,000. A 1″ wide strip was adhered at room temperature to a vacuum aluminized Mylar polyester film and produced a joint requiring 30 oz. force to fail in a 180° peel test at room temperature. A second 1″ wide strip joined to the same substrate was flexed repeatedly while immersed in liquid nitrogen (−196° C.).

In another example, a coating of 1.0 oz./sq. yd. of a polymer of butyl acrylate having a glass transition temperature of −45° C. and a molecular weight of 280,000 was applied to a 1 mil Mylar polyester film over a vacuum-deposited tin coating on such film. This coated film was then rolled up, interleaving it with a silicone liner and slit into 1″ rolls. The tape was then used to adhere vacuum metallized Mylar film to form a container. Two pieces of vacuum aluminized film were used to form the sides and bottom of an open-ended bag and the tape used to adhere the film pieces together (the adhesive contacting the metallized side of the film). The resultant bag was filled with liquid nitrogen and no leakage occurred during a 10 minute test period during which the edges of the bag were continuously flexed. A similar test was conducted using liquid helium with the same result (−269° C.).

What is claimed is:
1. A cryogenic joint comprising:
 (a) a first layer of a fluid-impervious film;
 (b) a thin layer of vacuum-deposited metal adhering to at least one surface of said film;
 (c) a second layer of a fluid-impervious film;
 (d) a thin layer of vacuum-deposited metal adhering to at least one surface of said second layer of film; and
 (e) interposed between and adhered to said thin layers of vacuum-deposited metal on each of said layers of film a pressure-sensitive polyacrylate adhesive having a glass transition temperature of from −30° C. to −60° C. and a number average molecular weight of from 150,000 to 400,000.
2. A joint as in claim 1 wherein one of said layers of film and adhered metal is the backing of a pressure-sensitive adhesive tape supporting said polyacrylate adhesive.

References Cited

UNITED STATES PATENTS

| | | | |
|---|---|---|---|
| 2,817,124 | 12/1957 | Dybvig | 161—214 |
| 2,994,632 | 8/1961 | Brown | 156—332X |
| 3,152,950 | 10/1964 | Palmquist | 161—214 |
| 3,308,010 | 3/1967 | Engelhardt | 156—332X |

JOHN T. GOOLKASIAN, Primary Examiner

J. D. SMITH, Assistant Examiner

U.S. Cl. X.R.

156—332; 161—218, 227